Jan. 6, 1931.   N. P. HINTON   1,788,106
RECEIVING APPARATUS FOR HIGH FREQUENCY SIGNALING SYSTEMS
Filed Aug. 28, 1925   2 Sheets-Sheet 1

WITNESSES:

INVENTOR
Norman Pullen Hinton.
BY
Wesley G. Carr
ATTORNEY

Jan. 6, 1931.  N. P. HINTON  1,788,106
RECEIVING APPARATUS FOR HIGH FREQUENCY SIGNALING SYSTEMS
Filed Aug. 28, 1925  2 Sheets-Sheet 2

WITNESSES:

INVENTOR
Norman Pullen Hinton.
BY
ATTORNEY

Patented Jan. 6, 1931

1,788,106

UNITED STATES PATENT OFFICE

NORMAN PULLEN HINTON, OF TIMPERLEY, ENGLAND, ASSIGNOR TO ASSOCIATED ELECTRICAL INDUSTRIES LIMITED, A BRITISH COMPANY

RECEIVING APPARATUS FOR HIGH FREQUENCY SIGNALING SYSTEMS

Application filed August 28, 1925, Serial No. 53,076, and in Great Britain September 11, 1924.

This invention relates to receiving apparatus for high frequency signaling systems such as wireless telephony and telegraphy and is also applicable to so-called "wired wireless" systems. The invention relates particularly to the arrangement and constitution of high frequency inductance coils of receiving apparatus in which high frequency and retroactive valve amplication are employed. The object of the invention is to provide an arrangement of the high frequency coils by which efficient reception can be obtained over any desired bands of wave lengths, by which tuning is easy to effect, and in which the extent of retroaction and the tendency of the receiver to self-oscillation can be readily controlled even by unskilled persons.

According to this invention in a receiving system for high frequency electric signals which comprises a plurality of inductance coils one of said inductance coils is movably mounted so that its coupling with two or more of the other inductance coils may be varied at will. Preferably the coils are so arranged that the mutual inductance between the moving coil and the other coils may be varied between a maximum positive value and a negative value.

The invention also comprises a unit for a receiving system comprising three or more coils of which two are disposed in substantially the same plane or parallel adjacent planes and a third is mounted to move in a plane adjacent and parallel to the first mentioned plane or planes.

Figure 1:
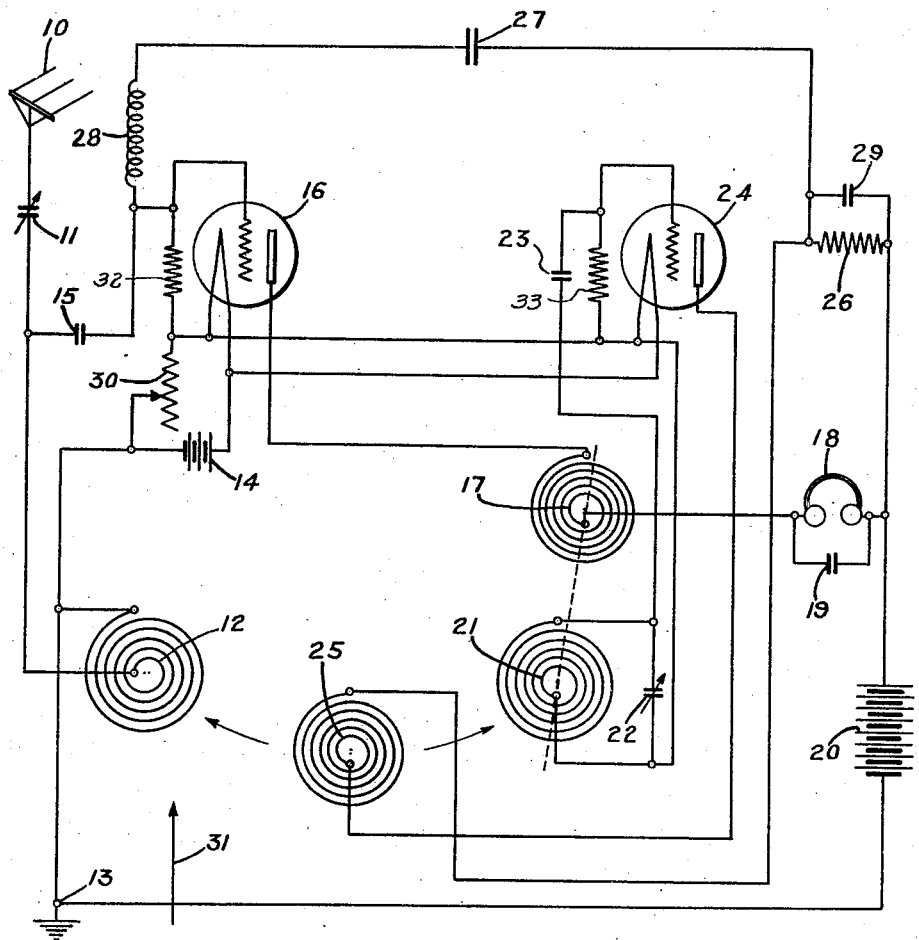
Figure 2:
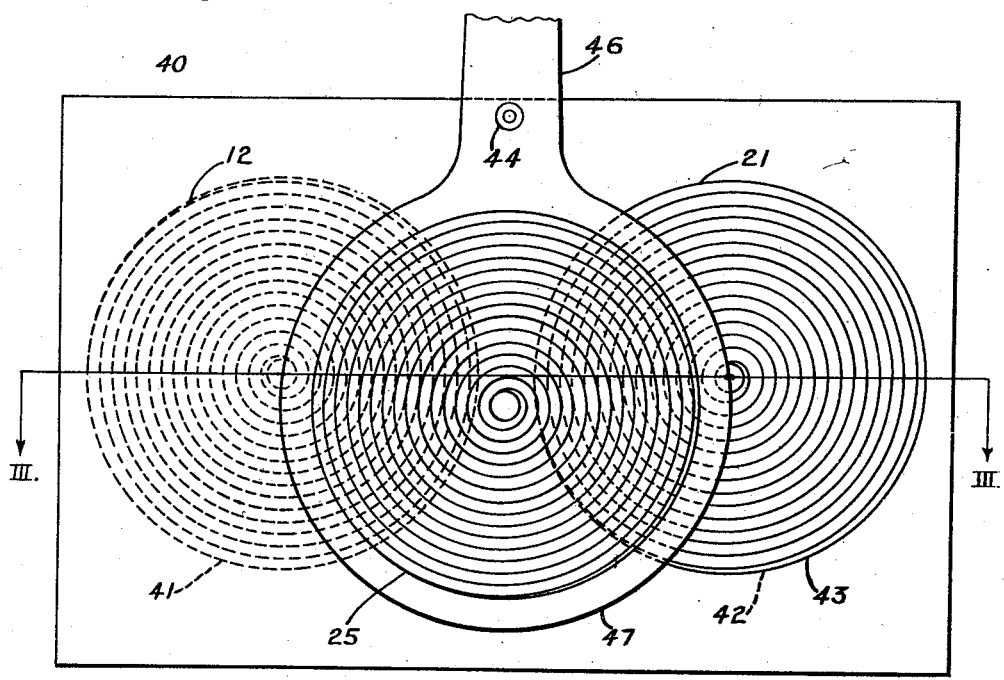
Figure 3:
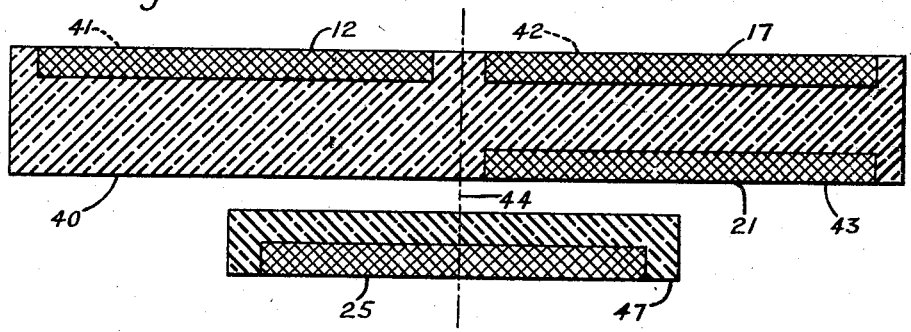

To enable the invention to be more clearly understood one form of wireless receiver employing the invention and an inductance unit constructed according to the invention will now be described with reference to the accompanying drawings in which Fig. 1 is a diagrammatic representation of a complete two-valve wireless receiver in which the first valve operates both as a high frequency and as a low frequency amplifier and Fig. 2 is a front elevation, partly diagrammatic, of an inductance unit and Fig. 3 is a section on the line III—III of Fig. 2 looking in the direction of the arrows.

Referring firstly to Fig. 1 the aerial 10 is connected through a variable tuning condenser 11 to the innermost turn of a flat spiral inductance 12. The outer end of the inductance 12 is connected to an earth terminal 13. The earth terminal 13 is also connected to the negative terminal of a cathode heating battery 14. The lower or inductance side of the variable condenser 11 is connected through an isolating condenser 15 to the grid of a thermionic valve 16. The grid of the valve 16 is connected to the negative end of its cathode through a usual grid leak resistance 32.

The anode of the valve 16 is connected directly to the outermost convolution of a flat spiral inductance 17. The innermost convolution of the inductance 17 is connected through the telephones 18, which are shunted by a condenser 19, to the positive terminal of the high tension battery 20. A flat spiral inductance 21 is disposed coaxial and parallel with the inductance 17 so that it is electromagnetically coupled thereto. The coupling of the inductance 21 to the inductance 17 may be fixed or variable as desired but is preferably fixed. The inductance 21 is shunted by a variable condenser 22 and its outermost convolution is connected through a grid condenser 23 to the grid of a second valve 24 and the innermost convolution is connected to the cathode of the valve 24. The grid of the valve 24 is connected to the cathode by a leak resistance 33 so that the valve 24 will function as a detector.

The anode of the valve 24 is connected to the inner end of an inductance 25 which constitutes a reaction coil. The outer end of the reaction coil 25 is connected through a high resistance 26 to the positive terminal of high tension battery 20 and through the block condenser of high capacity 27 and high frequency choke coil 28 to the grid of the valve 16 whereby to pass back audio-frequency variations of potential from the anode of the valve 24 to the grid of the valve 16. The resistance 26 is shunted by a condenser 29. The negative terminal of the high tension battery 20 is connected to the earth terminal 13. The filament heating battery 14 is connected through an adjustable resistance 30 to the cathode of the valves 16 and 24 in parallel in known manner.

The inductance coils 12, 17, 21 and 25 are all wound in a clockwise direction from the inside to the outside looking upon them in the direction of the arrow 31. The actual disposition of the coils 12, 17, 21 and 25 will be more readily appreciated with reference to Figs. 1 and 2. A block of ebonite or the like 40 has three circular recesses 41, 42 and 43 formed in it which accommodate respectively the aerial tuning coil 12, the anode inductance 17, the secondary inductance 21 which is coupled to the anode inductance 17.

A pivot 44 is provided near the upper edge of the block of ebonite 40. An arm 46 carrying at its lower end a box 47 and at its upper end a handle, not shown, is mounted upon the pivot. The reaction coil 25 is disposed in the box 47.

It will be seen that when the coils are wound and connected as described with reference to Fig. 1 and are mounted in the geometrical relationship described with reference to Fig. 2 the coupling between the coils 12, 17 and 21 is such as to tend to oppose regeneration, thereby stabilizing the set. When the reaction coil is in its mid position, as shown in Fig. 2, its coupling with the aerial tuning coil 12 and the anode and secondary coils 17 and 21 is in such a direction in each case as to tend to oppose regeneration, thus further assisting in the stabilization of the set. When however the reaction coil 25 is displaced from its mid position towards the coils 17 and 21 reaction is applied around the second valve 24 thereby causing regeneration in the circuit associated with the valve and the maximum reaction occurs when the axes of the coils 25 and 21 are coincident. When the coil 25 is displaced from its mid position towards the coil 12 reaction is introduced around both valves 16 and 24 causing regeneration in the circuits of these valves. Since reaction around two valves is more sensitive than reaction around one valve the aerial coil 12 is placed on the side of the block of ebonite 40 remote from the reaction coil 25 so that the maximum coupling between the reaction coil 25 and the aerial tuning coil 12 is somewhat less than that between the reaction coil 25 of the secondary 21.

It will be appreciated that the above description is given by way of example only and many modifications may be made without departing from the scope of this invention.

I claim as my invention:

1. In a radio receiving system, two vacuum tubes, each having an input circuit and an output circuit, a coil in the output circuit of one tube, coils, one in the input circuit of each tube, each having a fixed coupling to the first-mentioned coil, said coupling being in the sense to tend to prevent regeneration and a coil in the output circuit of the other tube having an adjustable coupling to each of said input coils.

2. In a radio receiving system, two vacuum tubes, each having an input circuit and an output circuit, a disk coil in the output circuit of one tube, disk coils, one in the input circuit of each tube, each having a fixed coupling to the first-mentioned coil, said coupling being in the sense to tend to prevent regeneration, said output coil being coplaner with one of said input coils and coaxial with the other, and a disk coil movable in a plane parallel to said coplanar coils and on the opposite side of said coaxial coil therefrom, said movable coil being in the other output circuit and coupled to said input coils in a sense to cause regeneration.

3. In a radio receiving system, a vacuum tube having an input circuit including an inductor, an output circuit for said tube, the latter circuit serially including an inductor and an indicating device, a second vacuum tube having an input circuit including an inductor coupled to the inductor in the output circuit of the first tube, and an output circuit including a resistor and an inductor, the input inductors of the said tubes and the output inductor of the first tube, being so wound and so mutually coupled as to oppose regeneration in the system, means for variably coupling the output inductor of the second tube to the said input circuit inductors to control regeneration in the system, and means whereby potential variations at audio-frequency across said resistor may be impressed on the input circuit of the first tube.

4. In a radio receiving system of the reflex type, a thermionic device having an input circuit and an output circuit comprising an inductor and an indicating device, a second thermionic device having an input circuit comprising an inductor coupled to said first mentioned output inductor and an output circuit including a resistor, means whereby said second thermionic device functions as a detector, and a connection whereby potential variations at audio frequencies across said resistor may be impressed on the input circuit of the first tube for amplification therein, whereby the tendency toward regeneration at audio frequencies is minimized.

5. In a radio receiving system, a pair of vacuum tubes having input and output circuits, said input circuits including inductors loosely coupled electromagnetically to each other, an inductance coil in each of said output circuits, one of said inductance coils having a fixed coupling to said input inductors, and means whereby the other of said inductance coils may be variably coupled to the other coils for controlling regeneration in said system.

In testimony whereof I have hereunto subscribed my name this tenth day of August, 1925.

NORMAN PULLEN HINTON.